Figure 1:
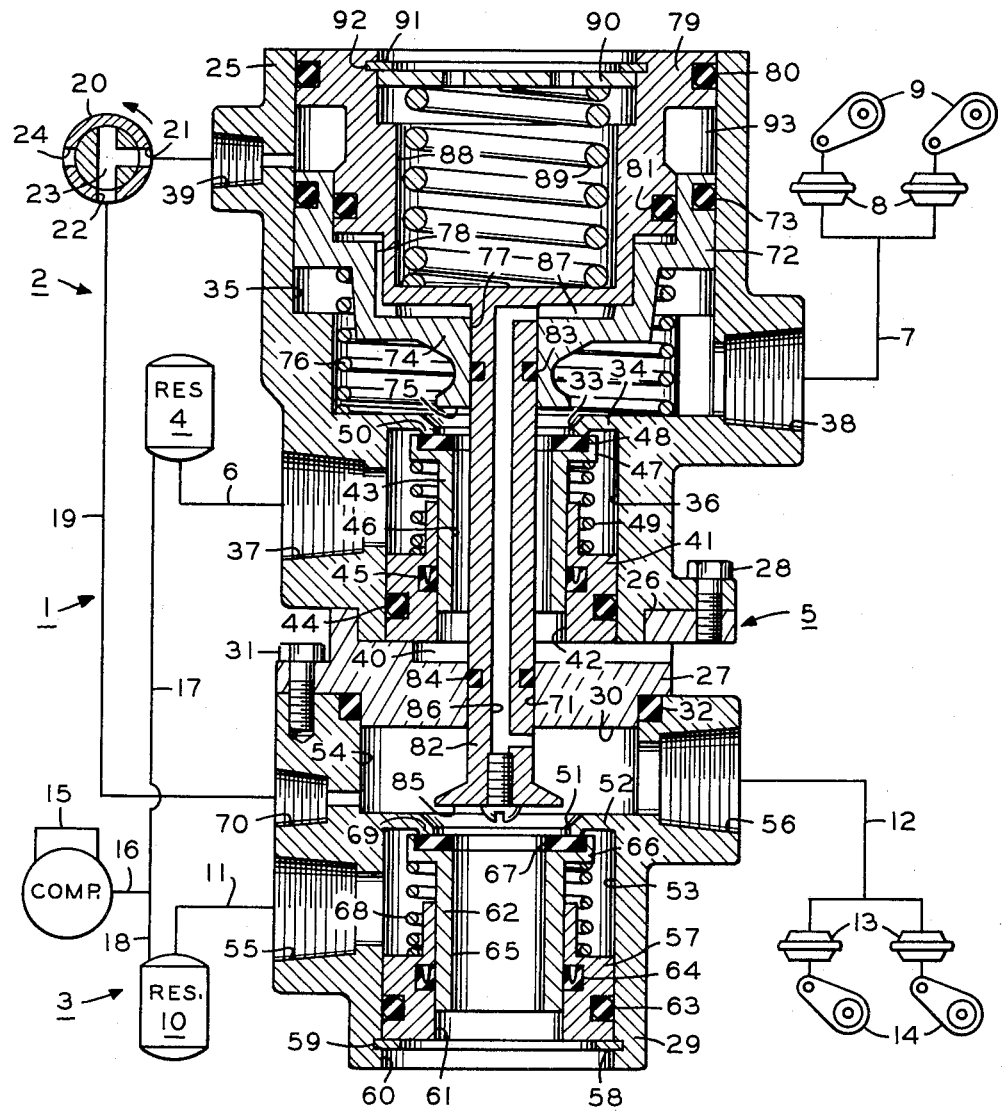

June 23, 1964 R. C. BUELER 3,138,410
RATIO SELECTOR VALVE
Filed Feb. 4, 1963 2 Sheets-Sheet 2

INVENTOR
RICHARD C. BUELER
BY
Joseph E. Papin.

United States Patent Office 3,138,410
Patented June 23, 1964

3,138,410
RATIO SELECTOR VALVE
Richard C. Bueler, Glendale, Mo., assignor to Wagner Electric Corporation, St. Louis, Mo., a corporation of Delaware
Filed Feb. 4, 1963, Ser. No. 255,892
21 Claims. (Cl. 303—52)

This invention relates to tandem control valves and in particular to tandem control valves of the ratio selector type.

In the past, tandem control valves were provided with separate valving therein for controlling pressure fluid flow in separate fluid pressure systems, and the valving was actuated by separate valve control or reaction means which were connected by a yoke-type linkage or the like to an operator pedal or treadle. One of the undesirable features of such past tandem control valves was that the reaction forces which provide "feel" as to the extent of the braking effort were each transmitted to the operator through the linkage from the reaction means. Another undesirable feature was that the "feel" varied upon failure of fluid pressure in one of the separate systems effecting variation in controlability which tended to confuse the operator. Another undesirable feature was that an appreciable lost stroke in the operator treadle also accompanied the failure of fluid pressure in one of the separate systems. Still another undesirable feature was that the control of the separate system could not be sequenced, i.e., one system actuated slightly before the other system to reduce the tendency of skid on slippery pavements. And still another undesirable feature was the requirement of an intermediate connecting linkage between the separate reaction means and the operator treadle.

It is an object of the present invention to provide a tandem control valve which overcomes the aforementioned undesirable and objectionable features.

Another object of the present invention is to provide a tandem control valve for controlling the flow of fluid pressure in separate fluid pressure systems wherein the fluid pressure of the flow in said separate systems will be in a predetermined ratio.

These and still other objects and advantages will become more apparent hereinafter.

Briefly, the invention embodies a tandem control valve having a pair of valve means therein which are operatively controlled by a pair of valve control means for controlling pressure fluid flow in separate systems. One of said valve control means having separate areas responsive to the establishment of fluid pressure flow in one of the separate systems to actuate one of said valve means and establish a substantially equal fluid pressure flow in the other of the separate systems, and means for venting one of said areas to atmosphere wherein a fluid pressure flow of predetermined ratio is established in the other system, the other of said valve control means being responsive to an applied force to actuate the other of said valve means to establish the pressure fluid flow in the one system.

Figure 2:
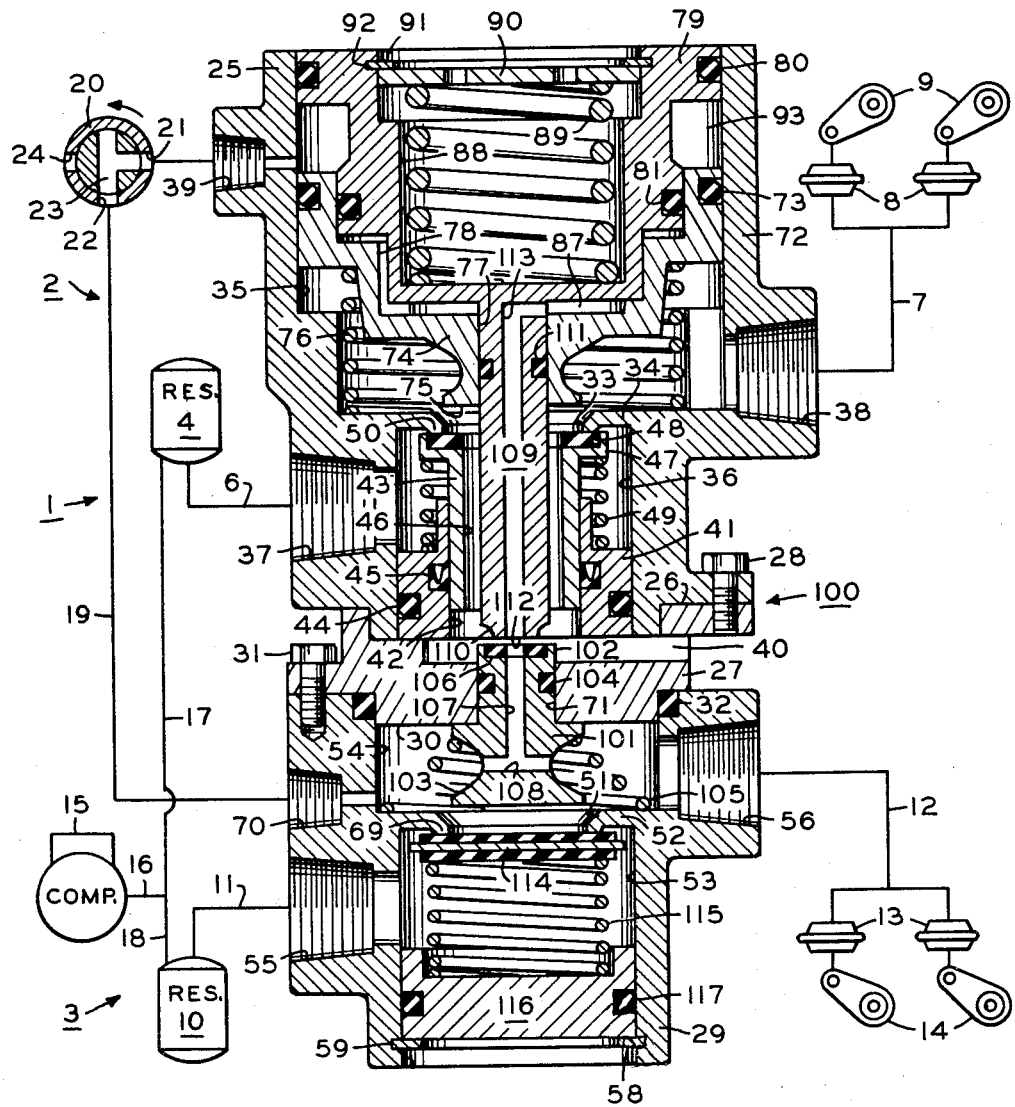

The invention also consists in the parts and arrangements of parts hereinafter described and claimed. In the accompanying drawings which form a part of the specification and wherein like numerals refer to like parts wherever they occur:

FIG. 1 is a diagrammatic view of a fluid pressure system showing an embodiment of the present invention connected therein in cross section, and FIG. 2 is a cross-sectional view of another embodiment of the present invention shown connected in the fluid pressure system of FIG. 1.

Referring now to FIG. 1, a dual brake actuating system 1 is shown having separate fluid pressure branches indicated generally at 2 and 3. The branch 2 includes a reservoir 4 for fluid pressure storage which is connected to one of a pair of separate inlet ports of a treadle operated ratio selector valve 5 by a conduit 6. The ratio selector valve or tandem control valve 5 is also provided with a pair of separate outlet ports, and a service line or conduit 7 connects one of said outlet ports with a set of brake chambers 8 which are linked with slack adjusters 9 to control the energization of an axle set of vehicle brake assemblies (not shown). The branch 3 includes a reservoir 10 for fluid pressure storage which is connected to the other of the inlet ports of the control valve 5 by a conduit 11, and another service line or conduit 12 connects the other of the outlet ports of said control valve with another set of brake chambers 13 which are linked with slack adjusters 14 to control the energization of another axle set of vehicle brake assemblies (not shown). A compressor 15 is connected with reservoirs 4 and 10 by a conduit 16 which branches at 17 and 18, said compressor and separate reservoirs forming in combination separate fluid pressure sources. To complete the system 1, another conduit 19 is connected between a pair of control or ratio ports which are provided in the control valve 5, and a two-way ratio or hand valve 20 is provided with an inlet and outlet 21 and 22 serially connected in the conduit 19. Passage means 23 in the ratio valve normally provides open pressure fluid communication between the ratio ports through the conduit 19, however, the ratio valve 20 may be rotated clockwise (in the direction of the arrow) to position the passage means 10 between the outlet 22 and an exhaust 24 thereby interrupting communication between the control ports and venting one of said control ports to atmosphere.

The tandem control valve 5 is provided with an upper housing 25 which is connected to an upper end portion or wall 26 of an intermediate housing or separation plate 27 by suitable means, such as a plurality of studs 28. A lower housing 29 is sealably connected with a lower end portion or wall 30 of the intermediate housing 26 by suitable means, such as studs 31, and a sealing ring 32 is sealably interposed between said intermediate and lower housings.

The upper housing 25 is provided with a bore 33 defining an annular wall 34 axially positioned between an upper stepped counterbore 35 and a lower counterbore 36 forming a set of outlet and inlet chambers respectively. An inlet port 37 which receives the conduit 6, as previously mentioned, is provided in the upper housing 25 connecting with the counterbore 36, and an outlet port 38 which receives the service line 7, as previously mentioned, is provided in said upper housing connecting with the counterbore 35. A control or ratio port 39 which receives the conduit 19, as previously mentioned, is also provided in the upper housing 25 connecting with the counterbore 35.

A recess 40 is provided in the upper portion 26 of the intermediate housing 27 beneath the counterbore 36 forming an exhaust chamber or port. A valve guide member 41 is received in the lower end of the counterbore 36 and is normally seated on the upper end 26 of the intermediate housing 27. The valve guide member 41 is provided with a bore 42 in which an inlet valve element 43 is slidable, and seals 44 and 45 are carried by said valve guide member in sealing engagement with the counterbore 36 and said inlet valve element, respectively. The inlet valve element 43 is provided with an exhaust bore or exhaust opening 46 and has an enlarged sealing head 47 in the upper end thereof, the sealing head including an annular resilient seal or disc 48. A valve spring 49 is provided between the valve guide 41 and the sealing head 47 and normally urges the valve seal 48 into sealing engagement with a valve seat 50 which is formed on the wall 34 at the juncture of the bore 33 and counterbore 36.

The lower housing 29 is provided with a bore 51 defining an annular wall 52 axially positioned between counterbores 53 and 54 which form inlet and outlet chambers, respectively. Another inlet port 55 which receives the conduit 11, as previously mentioned, is provided in the lower housing 29 connecting with the counterbore 53, and another outlet or working port 56 which receives the service line 12, as previously mentioned, is connected with the counterbore 54. Another valve guide member 57 is positioned against displacement in the counterbore 53 by a snap ring 58 received in a groove 59 adjacent the lower end of said counterbore, and the lower end of said counterbore forms an exhaust port 60. The valve guide 57 is provided with a bore 61 in which another inlet valve element 62 is slidable, and seals 63 and 64 are carried by said valve guide in sealing engagement with the counterbore 53 and said inlet valve element, respectively. The inlet valve element 62 is provided with an axial bore or exhaust opening 65 and has an enlarged sealing head 66 on the upper end thereof, the sealing head including an annular resilient seal or disc 67. A valve spring 68 is provided between the valve guide 57 and the sealing head 66 and normally urges the valve seal 67 into sealing engagement with a valve seat 69 which is formed on the wall 52 at the juncture of the bore 51 and counterbore 53. Another ratio port 70 which receives the other end of the conduit 19, as previously mentioned, is provided in the lower housing 29 and connects with the counterbore 54. The intermediate housing 27 is provided with a centrally located bore 71 which is axially aligned with the bores 33 and 51 in the upper and lower housings 25 and 29, respectively.

A relay piston or valve control element 72 is slidably received in the counterbore 35, and a seal 73 is carried by said relay piston in sealing engagement with said counterbore. The relay piston 72 is provided with an integral extension 74 having a valve seat 75 on the lower end thereof which is coaxial with the bore 33 and is normally maintained in spaced relation with the valve seal 48 of the inlet valve 43 by a return spring 76. A bore 77 is provided through the relay piston extension 74 and connects with an aligned stepped counterbore 78 provided in said relay piston. A stepped reaction piston or valve control element 79 is also slidably received in the housing counterbore 35 and the counterbore 78 of the relay piston 72, and seals 80 and 81 are carried by said reaction piston in sealing engagement with the counterbores 35 and 78, respectively. The reaction piston 79 extends coaxially into the counterbore 78 of the relay piston 72 and normally abuts the shoulder provided between the counterbore 78 and bore 77 of said relay piston. The reaction piston 79 is provided with an extension or stem portion 82 which extends coaxially downwardly through the relay piston bore 77, the exhaust opening 46 of the inlet valve 43, the bore 71 of the intermediate housing 27 into the counterbore 54 of the lower housing 29. The extension 82 is slidably received in the relay piston bore 77 and the intermediate housing bore 71, and seals 83 and 84 are carried on said extension in sealing engagement with said relay piston bore and intermediate housing bore.

A valve seat 85 is provided on the free end of the extension 82 in the counterbore 54 for engagement with the sealing disc 67 of the inlet valve 62, and a passage 86 is provided in said extension 73 having one end in open pressure fluid communication with the counterbore 54 and the other end thereof in open pressure communication with an expansible application chamber 87 formed in the counterbore 78 of the relay piston 72 between said relay piston and the reaction piston 79. The reaction piston 79 is also provided with a reaction spring bore 88 in the upper end thereof, and a precompressed reaction spring 89 is retained therein against displacement by a force receiving plate 90 and snap ring 91 which is positioned in a groove 92 provided adjacent the upper end of said reaction spring bore. To complete the control valve 5, another expansible chamber or ratio chamber 93 is formed in the upper housing counterbore 35 between the relay and reaction pistons 72 and 79 in open pressure fluid communication with the ratio port 39.

In the operation, with the passage means 23 of the two-way valve 20 connecting the ratio ports 39 and 70 in pressure fluid communication the conduit 19, as described, a manually applied force by the operator through the foot treadle onto the force receiving plate 90 of the reaction piston 79 moves said reaction piston and the relay piston 72 downwardly against the negligible force of the return spring 76 to engage the valve seat 85 on the free end of the extension 82 with the valve seal 67 of the inlet valve 62 closing the exhaust passage 65 and isolating the outlet chamber 54 from the atmosphere. Further downward movement of the reaction piston 79 disengages the inlet valve 62 from the seat 69 on the wall 52 to establish pressure fluid communication between the inlet and outlet ports 55 and 56. The pressure fluid flows from the reservoir 10 through the conduit 11, the inlet port 55, the inlet chamber 53 and the passage or bore 51 into the outlet or working chamber 54 and therefrom into the service line 12 to actuate the brake chamber 13 and rotate slack adjusters 14 to energize the axle set of wheel brake assemblies associated therewith. At the same time, the pressure fluid so admitted into the outlet chamber 54 flows therefrom through the passage 86 in the extension 82 into the application chamber 87 and also through the ratio port 70, the conduit 19, the ratio valve 20, and the ratio port 39 into the ratio chamber 93. The fluid pressure so established in the application and ratio chambers 87 and 93 acts on the effective areas of the relay piston 72 therein creating an application force to move said relay piston downwardly independently of the reaction piston 79 to engage its valve seat 75 with the valve seal 48 of the inlet valve 43 closing the exhaust passage 46 and isolating the outlet chamber 35 from the atmosphere. Further downward movement of the relay piston 72 disengages the inlet valve 43 from the seat 50 on the wall 34 to establish pressure fluid communication between the inlet and outlet ports 57 and 38. The pressure fluid flows from the reservoir 4 through the conduit 6, the inlet port 37, the inlet chamber 36, the passage or bore 33 and the outlet chamber 35 into the outlet port 38 and therefrom through the service line 12 to actuate the brake chambers 13 and rotate slack adjusters 14 to energize the axle set of wheel brake assemblies associated therewith. It should be noted that the inlet valve 62 is opened before the inlet valve 43.

When the reaction force created by the established fluid pressure in the application and ratio chambers 87 and 93 acting on the effective areas of the reaction piston 79 therein equals the manually applied force, said reaction piston is moved upwardly against the compressive force of the metering spring 89 wherein the inlet valve 62 is positioned in lapped engagement with the valve seat 69 and the reaction piston valve seat 85 is positioned in lapped engagement wtih said inlet valve. The reaction force acting through the metering spring 89 against the manually applied force on the plate 90 affords the operator an accurate and direct "feel" as to the extent of the braking effort or application. Similarly, when the reaction force created by the established fluid pressure in the outlet chamber 35 acting on the effective area of the relay piston 72 therein equals the application force on said relay piston, said relay piston is also moved upwardly wherein the inlet valve 43 is positioned in lapped engagement with the valve seat 50 and the relay piston valve seat 75 is positioned in lapped engagement with said inlet valve. In the lapped position, it should be noted that the reaction force on the relay piston 72 is substantially equal and opposite to the application force thereon. If greater braking effort is desired, a manually applied force is increased which results in an increased application force and the component parts of the control valve 5 function in the same manner as previously described to again move said component parts to their lapped positions.

When the desired braking effort is attained, the manually applied force is removed from the reaction piston 79 wherein the fluid pressure in the application and ratio chambers 87 and 93 serves to move said reaction piston upwardly toward its original position and the valve spring 68 returns the inlet valve 62 into sealing engagement with the valve seat 69. Initially, this upward movement sealably re-engages the inlet valve seal 67 with the seat 69 to again interrupt fluid pressure communication between the inlet and outlet ports 55 and 56, and further upward movement of said reaction piston disengages the extension valve seat 85 from the inlet valve seal 67 to re-establish communication between the outlet port 56 and the atmosphere and de-energize the wheel brake assemblies associated therewith by exhausting pressure fluid from brake chambers 13 through the service line 12 and said outlet port, the outlet chamber 54, the inlet valve exhaust passage 65 and the exhaust port 60 in the lower housing 29. The fluid pressure is also exhausted from the application chamber 87 through the passage 86 in the reaction piston extension 82 into the outlet chamber 54 and therefrom to atmosphere, as described above, and at the same time fluid pressure is also exhausted from the ratio chamber 93, the ratio port 39, the conduit 19 and two-way valve 20, the ratio port 70 into the outlet chamber 54 and therefrom to atmosphere, as described above. In this manner, exhaustion of the application and ratio chambers 87 and 93 eliminates the application force on the relay piston 72. Upon the elimination of the application force, the return springs 49 and 76 move the inlet valve 43 and the relay piston 72 upwardly to their original positions. Initially this upward movement sealably re-engages the valve seal 48 with the valve seat 50 to again interrupt fluid pressure communication between the inlet and outlet ports 37 and 38, and further upward movement of the relay piston 72 disengages its valve seat 75 from the valve seal 48 to open the inlet valve exhaust passage 46 and re-establish communication between the outlet port 38 and the atmosphere to de-energize the wheel brake assemblies associated therewith by exhausting fluid pressure from brake chambers 8 through the service line 7 and said outlet port, the outlet chamber 35 and the inlet valve exhaust passage 46, and therefrom to atmosphere through the exhaust port 40 in the intermediate housing 27.

Since the additive effective areas of the relay piston 72 in the application and ratio chambers 87 and 93 are substantially equal to and opposite the effective area of said relay piston in the outlet chamber 35, it is apparent that the above described braking application resulted in a substantially 1:1 ratio between the fluid pressure of the established flow in the branches 2 and 3. In other words, the fluid pressure of the flow established in the branch 3 and applied to the application and ratio chambers 87 and 93 acted on the relay piston 72 to establish flow in the branch 2 having a fluid pressure substantially equal to that of the branch 3 and acting in the outlet chamber 35 on said relay piston. If the operator desires to reduce the fluid pressure of the flow established in the branch 2 so that the ratio between branches 2 and 3 is less than 1:1, the two-way valve 20 is rotated counterclockwise (in the direction of the arrow) to a position aligning the passage means 23 between the outlet and exhaust 22 and 24. In this manner, pressure fluid communication between the ratio ports 39 and 70 is interrupted and the ratio chamber 93 is vented to atmosphere through the ratio port 39, the conduit 19 and the inlet, passage means and exhaust 21, 23 and 24, respectively, of the two-way valve 20. A manual force applied to the reaction piston 79 by the operator actuates the inlet valve 62, as previously described, to establish fluid pressure flow in the branch 3 creating a fluid pressure in the outlet chamber 54 to actuate the brake chambers 12. Since the two-way valve 20 is positioned to obviate flow therethrough from the ratio port 70 to the ratio port 38 while exhausting the ratio chamber 93, the established flow is passed only from the outlet chamber 54 through the extension passage 86 into the application chamber 87. The fluid pressure so established in the application chamber 87 acts on the effective area of the relay piston 72 therein creating an application force to move said relay piston downwardly to actuate the inlet valve 43, as previously described, and establish fluid pressure flow in the branch 2; however, since the effective area of the relay piston 72 in the outlet chamber 35 is greater than that in the application chamber 87, a proportionally smaller fluid pressure is established in the outlet chamber 35 to act on the greater effective area of said relay piston therein creating a reaction force in opposition to the application force and actuating the brake chambers 13. Since the smaller fluid pressure of the established flow in branch 2 acting on the larger effective area of the relay piston 72 in the outlet chamber 35 is opposed by the larger fluid pressure of the flow in the branch acting on the smaller effective area of said relay piston in the application chamber 87, it is apparent that these forces are self-cancelling and that the operator feels only the reaction force of the fluid pressure in the branch 3 acting on the reaction piston 79 in the application chamber 87.

In the event of the failure of the branch 3 with a resultant loss of fluid pressure in the reservoir 10, the manually applied force on the reaction piston 79 is transmitted directly to the relay piston 72 through the engagement of said reaction piston with the shoulder formed between the bore 77 and counterbore 78 of said relay piston to effect direct actuation of the inlet valve 43. In this manner, the reaction piston 79 is moved downwardly in response to the applied force thereon to actuate the inlet valve 62; however, since the branch 3 is assumed to have failed, the establishment of fluid pressure therein is obviated. Of course, the applied force is transmitted directly to the relay piston 72; therefore, further downward movement of the reaction and relay pistons 79 and 72 effects actuation of the inlet valve 43 to establish fluid pressure flow in the branch 2, as previously described. The fluid pressure established in the outlet chamber 35 acts on the effective area of the relay piston 72 therein to create a reaction force in opposition to the applied force thereby affording the operator a direct and accurate "feel" as to the extent of the braking effort. It should be noted that lost stroke is maintained at a minimum upon failure of the branch 3. In other words, the lost stroke represents only the movement of the reaction piston 79 after the inlet valve 62 is unseated and until the relay piston 72 unseats the inlet valve 43.

In the event of the failure of the branch 2 with a resultant loss of the fluid pressure in the reservoir 4, the applied force on the reaction piston 79 actuates the inlet valve 62 to establish fluid pressure flow in the branch 3, as previously described. In this manner, pressure fluid is established in the outlet chamber 54 and brake chambers 8, and the fluid pressure also passes through the passage 86 in the reaction piston extension 82 into the application chamber 87. If the hand valve 20 is positioned to pass fluid pressure from the outlet chamber 54 to the ratio chamber 93, then fluid pressure is also simultaneously established in said ratio chamber. The fluid pressure in the application and ratio chambers 87 and 93 serves to move the relay piston 72 to actuate the inlet valve 43; however, since it is assumed that the branch 2 has failed, the establishment of flow therein is, of course, obviated. Nevertheless, the fluid pressure in the application and ratio chambers 87 and 93 acts on the reaction piston 79 creating a reaction force in opposition to the applied force to afford the operator a direct and accurate "feel" of the braking effort or application. Of course, lost stroke is obviated upon failure of the branch 2 since the operator feels the reaction force as soon as the inlet valve 62 is unseated.

Referring now to FIG. 2, a control valve 100 is shown having substantially the same component parts functioning in the system 1 in substantially the same manner as the previously described control valve 5 with the following exceptions. The control valve 100 is provided with a valve seating member 101 slidably received in the intermediate housing bore 71 with upper and lower free end portions 102 and 103 extending into the intermediate housing recess 40 and the lower housing counterbore 54, respectively, and an O-ring seal 104 is carried on said valve seating member in sealing engagement with said intermediate housing bore. A return spring 105 of negligible compressive force is biased between the wall 52 in the counterbore 54 and the valve seating member 101 to normally urge said valve seating member into abutment with the lower end portion 30 of the intermediate housing 27. An annular resilient seal or disc 106 is carried in the upper free end portion 102, and a vertical passage 107 is provided in the valve seating member 101 having an upper end extending coaxially through the seal 106 in open pressure fluid communication with the intermediate housing recess 40 and a lower end intersected by cross passages 108 provided in the lower free end portion 103 in open pressure fluid communication with the counterbore 54.

The reaction piston 79 is provided with an extension or stem portion 109 which is slidable in the relay piston bore 77 and extends coaxially through the inlet valve exhaust opening 46 with a lower free end portion 110 terminating in the intermediate housing recess 40, said extension having an O-ring seal 111 in sealing engagement with said relay piston bore. A valve seat 112 is provided on the free end 110 of the extension 109 for sealing engagement with the seating member seal 106, and a passage 113 is provided in said extension having one end connecting with the expansible chamber 87 and the other end thereof extending coaxially through the valve seat 112 in open pressure fluid communication with the intermediate housing recess 40 and in axial alignment with the vertical passage 107 in the seating member 101. While the extension seat 112 is shown normally in juxtaposition with the seating member seal 106, it is also contemplated that said extension seat can normally be positioned in sealing engagement with said seating member seal without affecting the operation of the control valve 100. A undirectional check valve 114 is provided in the lower housing counterbore 53 and normally biased into sealing engagement with the seat 69 on the wall 52 by one end of a return spring 115 to interrupt pressure fluid communication between the inlet and outlet ports 55 and 56. The other end of the return spring 115 is engaged with a plug or bore closure member 116 retained in the lower end of the counterbore 53 against displacement by the snap ring 58. An O-ring seal 117 is carried in the plug 116 in sealing engagement with the counterbore 53.

In the operation, the applied force on the reaction piston 79 moves the extension seat 112 into sealing engagement with the seating member seal 106 interrupting pressure fluid communication between the outlet and application chambers 54 and 87 and the atmosphere and communicating said chambers through the seating member and extension passages 107, 108 and 113. Further downward movement of the reaction piston 79 moves the seating member 101 against the return spring 105 to engage the lower free end 103 of said seating member with the inlet valve 114 and thereafter disengage the inlet valve 114 from the seat 69 on the wall 52 to establish pressure fluid communication between the inlet and outlet ports 55 and 56 to actuate the brake chambers 13 and slack adjusters 14 and energize the wheel brake assemblies associated therewith, as previously described. The fluid pressure established in the outlet chamber 54 passes through the seating member passage and cross passage 107 and 108 and the extension passage 113 into the application chamber 87 and also passes through the ratio port 70, the conduit 19 and two-way valve 20, and the ratio port 39 into the ratio chamber 93. The fluid pressure so established in the application and ratio chambers 87 and 93 acts on the effective areas of the relay piston 72 therein to move said relay piston into actuating engagement with the inlet valve 43 to establish pressure fluid communication between the inlet and outlet ports 37 and 38 thereby actuating the brake chambers 8 and slack adjusters 9 and energizing the wheel brake assemblies associated therewith, as previously described.

When the desired braking effort is attained and the manually applied force is removed from the reaction piston 79, the fluid pressure in the application and ratio chambers 87 and 93 serves to move said reaction piston upwardly toward its original position and the return springs 68 and 105 move the inlet valve 114 and the seating member 101 upwardly to their original positions. Initially the upward movement sealably re-engages the inlet valve 114 with the seat 69 to again interrupt pressure fluid communication between the inlet and outlet ports 55 and 56 and re-engages said seating member in abutment with the lower end wall 30 of the intermediate housing 27. Further upward movement of the reaction piston 79 disengages the extension valve seat 112 from the seating member seal 106 to exhaust fluid pressure from the application chamber 87 through the extension passage 114 into the exhaust chamber 40 to atmosphere. At the same time fluid pressure is also exhausted from the ratio chamber 93 through the ratio port 39, the conduit 19 and two-way valve 20, the ratio port 70 into the outlet chamber 54 and therefrom via the passage and cross passages 107 and 108 in the seating member 101 into the exhaust chamber 40 to atmosphere. Upon exhaustion of the fluid pressure from the application and ratio chambers 87 and 93, the return springs 49 and 76 serve to move the inlet valve 43 and relay piston 72 upwardly to their original positions wherein pressure fluid communication between the inlet and outlet ports 37 and 38 is again interrupted and communication between said outlet port and the atmosphere is re-established through the inlet valve exhaust opening 46, as previously described. The action of the return spring 76 also serves to again abut the relay piston 63 with the reaction piston 70 to maintain said relay and reaction pistons in their original positions wherein the seat 112 on reaction piston extension 109 is disengaged from the seating member seal 106 to vent the application and ratio chambers 87 and 93 directly into the exhaust chamber 40 in the intermediate housing 27. Of course, a ratio application can be effected by merely repositioning the two-way valve 20, as previously described.

In the event of the failure of the branches 2 or 3 with the resultant loss of fluid pressure in the reservoirs 4 or 10, respectively, the reaction piston extension 109 drives the seating member 101 to actuate the inlet valve 114 and the relay piston 72 actuates the inlet valve 43 to effect pressure fluid flow in either the branch 2 or the branch 3, as previously described.

From the foregoing, it is now apparent that a novel control valve meeting the objects set out hereinbefore is provided and that changes or modifications to the precise configurations, shapes or details of the constructions set forth in the disclosure by way of illustration may be made by those skilled in the art without departing from the spirit of the invention as defined by the claims which follow.

What I claim is:

1. In a fluid pressure system having a pair of fluid pressure sources and a pair of brake chambers, a control valve comprising a housing, first application means slidable within said housing and movable in response to an applied force to effect the application of fluid pressure from one of the sources to one of the brake chambers, second application means slidable within said housing and concentric with said first application means, a pair of expansible chambers formed between said first and second application means, passage means in said first application means connecting one of said expansible chambers in open pressure fluid communication with the fluid pressure applied to the one brake chamber, said second application means being movable in response to fluid pressure in said one expansible chamber to effect the application of fluid pressure from the other of the sources to the other of the brake chambers, and other means for selectively connecting the other of said expansible chambers in open pressure fluid communication with the fluid pressure applied to the one brake chamber, said second application means being responsive to the fluid pressure in said expansible chambers upon connection of said other expansible chamber with the fluid pressure applied to the one brake chamber to increase the fluid pressure applied to the other brake chamber.

2. In a fluid pressure system having a pair of fluid pressure sources and a pair of brake chambers, a control valve comprising a housing, a pair of concentric application means slidable within said housing for controllnig the application of fluid pressure from the sources to the brake chambers, respectively, an expansible chamber formed between said application means, one of said application means being movable in response to an applied force to effect the application of fluid pressure from one of the sources to one of the brake chambers, passage means in said one application means connecting said expansible chamber in open pressure fluid communication with the fluid pressure applied to the one brake chamber, another expansible chamber formed in said housing between said application means, and selectively operable means normally connecting said other expansible chamber in open pressure fluid communication with the fluid pressure applied to the one brake chamber, the other of said application means being movable in response to fluid presure in said expansible chambers to effect the application of fluid pressure from the other of the sources to the other of the brake chambers in a predetermined ratio to that applied to the one brake chamber, said selectively operable means being movable to vent said other expansible chamber to atmosphere wherein said other application means is responsive only to the fluid pressure in said first named expansible chamber to apply fluid pressure to the other brake chamber in a ratio proportionally changed from the predetermined ratio.

3. In a fluid pressure system having a pair of fluid pressure sources and a pair of fluid pressure responsive motors, control means for controlling the application of fluid pressure from said sources to said motors, respectively, including a pair of application means, one of said application means being movable in response to an applied force to effect the application of fluid pressure from one of said sources to one of said motors, a pair of expansible chambers formed between said application means, means for respectively connecting said chambers in open pressure fluid communication with said one motor, the other of said application means being movable in response to fluid pressure in said chambers to effect the application of fluid pressure from the other of said sources to the other of said motors in a predetermined ratio with that applied to said one motor, and other means for interrupting the pressure fluid communication between one of said chambers and said one motor and venting said one chamber wherein said other application means is responsive only to the fluid pressure in the other of said chambers to apply fluid pressure to said other motor in a ratio different than the predetermined ratio.

4. The fluid pressure system acording to claim 3 including abutment means on said one application means for engagement with said other application means wherein said application means are concurrently movable in response to the applied force on said one application means to effect the application of fluid pressure to the other motor upon failure of the fluid pressure of the one source.

5. In a fluid pressure system having a pair of fluid pressure sources and a pair of brake chambers, a control valve comprising a housing, a pair of concentric application means slidable in said housing for controlling the application of fluid pressure from the sources to the brake chambers, respectively, an expansible chamber formed in one of said application means and between said application means, the other of said application means being movable in response to an applied force thereon to effect the application of fluid pressure from one of the sources to one of the brake chambers, passage means in said other application means connecting said expansible chamber in open pressure fluid communication with the fluid pressure applied to the one brake chamber, another expansible chamber formed in said housing and between said application means and connected in open pressure fluid communication with the fluid pressure applied to the one brake chamber, said one application means being movable in response to fluid pressure in said expansible chambers to effect the application of fluid pressure from the other of the sources to the other of the brake chambers in a predetermined ratio with that applied to the one brake chamber, and selectively operable means for interrupting the pressure fluid communication between the last named expansible chamber and one brake chamber and establishing pressure fluid communication between said last named expansible chamber and the atmosphere, said one application means being responsive to fluid pressure in said first named expansible chamber to proportionally change the fluid pressure applied to said other brake chamber from the predetermined ratio.

6. In a fluid pressure system having a pair of fluid pressure sources and a pair of brake chambers, a control valve for controlling the application of fluid pressure from the sources to the brake chambers including a housing, first application means movable within said housing in response to an applied force to apply fluid pressure from one of the sources to one of the brake chambers, second application means movable within said housing and concentric with said first application means, first and second expansible chambers between said first and second application means, passage means in said first means connecting said first expansible chamber in open pressure fluid communication with the fluid pressure applied to the one brake chamber, and means including selectively operable means connected between the second expansible chamber and the one brake chamber, said selectively operable means being adapted for movement between a first position connecting said second expansible chamber in open pressure fluid communication with the fluid pressure applied to the one brake chamber and a second position interrupting such open pressure fluid communication and venting said second expansible chamber to atmosphere, said second application means being movable in response to fluid pressure in said first and second chambers when said selectively operable means is in the first position to apply fluid pressure from the other of the sources to the other of the brake chambers in a predetermined ratio to that applied to the one brake chamber, and said second means being responsive to fluid pressure in only said first expansible chamber to apply fluid pressure to the other brake chamber in a ratio to that applied to the one brake chamber different from the predetermined ratio when said selectively operable means is in the second position.

7. In a fluid pressure system having a pair of fluid pressure sources and a pair of brake chambers, a control valve for controlling the application of fluid pressure from the sources to the brake chambers including a housing, means within said housing providing a pair of fluid pressure flow passages for connecting the sources with the brake chambers, respectively, a pair of valve means controlling said flow passages, an exhaust opening in each of said valve means connecting said brake chambers with the atmosphere, first valve control means slidable in said housing and adapted for operative engagement with one of said valve means, a first expansible chamber in said valve control means, second valve control means slidable in said housing and in said first expansible chamber, a second expansible chamber formed in said housing between said first and second valve control means, extension means on said second valve control means and extending through said first valve control means for operative engagement with the other of said valve means, said second valve control means being movable in response to an applied force thereon to move said extension means into engagement with said other valve means to close the exhaust port therein and move said other valve means to a position establishing pressure fluid flow in one of said flow passages, passage means in said extension means connecting said first expansible chamber in open pressure fluid communication with the established pressure fluid flow in said one flow passage, said first valve control means being movable in response to fluid pressure in said first expansible chamber into engagement with said one valve means to close the exhaust port therein and move said one valve means to a position establishing pressure fluid flow in the other of said flow passages, the fluid pressures of the established pressure fluid flows in said flow passages having a predetermined ratio, and other means for connecting said second expansible chamber in open pressure fluid communication with the established pressure fluid flow in said one flow passage, said first valve control means being responsive to fluid pressure in said second expansible chamber to further establish pressure fluid flow in said other flow passage and proportionally change the ratio between the fluid pressures of the established pressure fluid flows in said flow passages from the predetermined ratio.

8. A control valve for fluid pressure comprising a housing having a pair of sets of ports therein, each port set including inlet, outlet and exhaust ports, a pair of valve means controlling pressure fluid communication between the ports of said port sets, respectively, a pair of valve control means slidable in said housing for operative engagement with said valve means, a pair of expansible chambers formed between said valve control means, one of said valve control means being movable in response to an applied force into engagement with one of said valve means to move said one valve means to a position interrupting pressure fluid communication between the outlet and exhaust ports and establishing pressure fluid communication between the inlet and outlet ports of one of said port sets, passage means in said one valve control means connecting the fluid pressure at the outlet port of said one port set in open pressure fluid communication with one of said chambers, and other means for connecting the fluid pressure at the outlet port of said one port set in open pressure fluid communication with the other of said chambers including selectively operable means adapted for movement to interrupt such open pressure fluid communication and vent said other chamber to the atmosphere, said other valve control means being movable in response to fluid pressure in said chambers into engagement with the other of said valve means to move said other valve means to a position interrupting pressure fluid communication between the outlet and exhaust ports and establishing pressure fluid communication between the inlet and outlet ports of the other of said port sets, the fluid pressure at the outlet ports of said port sets having a predetermined ratio and having another ratio proportionally changed from the predetermined ratio upon movement of said selectively operable means.

9. A control valve for fluid pressure comprising a housing having a pair of sets of ports therein, each port set including inlet, outlet and exhaust ports, a pair of valve means normally controlling pressure fluid communication between the ports of said port sets, respectively, valve control means slidable in said housnig and adapted for operative engagement with one of said valve means, a first chamber in said valve control means, operator controlled means slidable in said housing and first chamber, a second chamber in said housing between said valve control means and operator controlled means, extension means on said operator controlled means extending through said valve control means for operative engagement with the other of said valve means, said operator controlled means being movable in response to an applied force to engage said extension means with said other valve means and move said other valve means to a position interrupting pressure fluid communication between the outlet and exhaust ports and establishing pressure fluid communication between the inlet and outlet ports of one of said port sets, passage means in said extension means connecting the fluid pressure at the outlet port of said one port set in communication with said first chamber, and other means connecting the fluid pressure at the outlet port of said one port set in communication with said second chamber including selectively operable means adapted for movement to a selected position to interrupt such comunication and establish communication between said second chamber and the atmosphere, said valve control means being movable in response to fluid pressure in said first and second chambers into engagement with said other valve means to move said other valve means to a position interrupting pressure fluid communication between the outlet and exhaust ports and establishing pressure fluid communication between the inlet and outlet ports of the other of said port sets, the fluid pressure at the outlet ports of said port sets having a predetermined ratio and having another ratio proportionally changed from the predetermined ratio when said selectively operable means is moved to the selected position.

10. A control valve for fluid pressure comprising a housing, a pair of sets of ports in said housing, each port set including an inlet, outlet and exhaust ports, a pair of valve means normally urged to closed positions to interrupt pressure fluid communication between the inlet and outlet ports of said port sets, respectively, an exhaust opening in each of said valve means normally venting the outlet ports of said port sets to atmosphere, respectively, valve control means slidable in said housing and having a first valve seat thereon for operative engagement with one of said valve means, a first chamber in said valve control means, operator controlled means slidable in said housing and said first chamber, extension means on said operator controlled means, said extension means being slidable in said valve control means and extending coaxially through said first valve seat, a free end on said extension means providing a second valve seat for operative engagement with the other of said valve means, the exhaust opening in said other valve means being closed upon movement of said second valve seat thereagainst in response to an applied force on said operator controlled means and said other valve means being thereafter moved to an open position to establish pressure fluid communication between the inlet and outlet ports of one of said port sets, passage means in said extension means having one end in communication with said first chamber and the other end thereof in communication with the fluid pressure at the outlet port of said one port set, the exhaust opening in said one valve means being closed by movement of said first valve seat thereagainst in response to movement of said valve control means by fluid pressure in said first chamber acting thereon and said one valve means being thereafter moved to an open position to establish pressure fluid communication between the inlet and outlet ports of the other of said port sets wherein the fluid pressure established at the outlet ports of said port sets have a predetermined ratio, and means including selectively operable means positioned to connect said second chamber to atmosphere when the fluid pressures at the outlet ports of said port sets are in the predetermined ratio, said selectively operable means being movable to another position to connect said second chamber in communication with the fluid pressure at the outlet port of said one port set wherein said valve control means is further movable to proportionally increase the fluid pressure at the outlet port of said other port set and proportionally change the predetermined ratio.

11. In a fluid pressure system having a pair of fluid pressure sources and a pair of fluid pressure responsive motors, control means for controlling the application of fluid pressure from said sources to said motors, respectively, including a pair of application means, one of said application means extending through the other of said application means and being movable in response to an applied force to effect the application of fluid pressure from one of said sources to one of said motors, a pair of expansible chambers formed between said application means, means in said one application means connecting one of said chambers in open pressure fluid communication with said one motor, said other application means being movable in response to fluid pressure in said one chamber to effect the application of fluid pressure from the other of said sources to the other of said motors, and other means for selectively connecting the other of said chambers in open pressure fluid communication with said one motor, said other application means being movable in response to fluid pressure in said chambers to change the value of the fluid pressure applied to said other motor.

12. In a fluid pressure system having a pair of fluid pressure sources and a pair of fluid pressure responsive motors, a control valve including a housing, means within said housing providing a pair of fluid pressure flow passages respectively connected between said sources and motors, a pair of application means slidable in said housing for controlling said flow passages, said application means defining with said housing a pair of expansible chambers between said application means, one of said application means being movable in response to an applied force to effect the application of fluid pressure flow through one of said flow passages, means for respectively connecting said expansible chambers in open pressure fluid communication with said flow passages, the other of said application means being movable in response to fluid pressure in said chambers to effect the application of fluid pressure through the other of said flow passages in a predetermined ratio with that applied through said one flow passage, and selectively operable means for interrupting the pressure fluid communication between one of said chambers and said one flow passage and venting said one chamber to atmosphere wherein said other application means is responsive to only the fluid pressure in the other of said chambers to apply fluid pressure through said other flow passage in a ratio to that applied through said one flow passage different than the predetermined ratio.

13. In a fluid pressure system having a pair of fluid pressure sources and a pair of fluid pressure responsive motors, a control valve including a housing, means within said housing providing a pair of pressure fluid flow passages respectively connected between said sources and motors, a pair of application means slidable in said housing and controlling the application of fluid pressure through said flow passages, one of said application means extending through the other of said application means and being movable in response to an applied force to effect the application of fluid pressure from one of said sources to one of said motors through one of said flow passages, a pair of expansible chambers between said application means, passage means in said one application means connecting one of said chambers with the fluid pressure applied through said one flow passage, and means including selectively operable means movable between a connecting position for connecting the other of said chambers with the fluid pressure applied through said one flow passage and a venting position for venting said other chamber with the atmosphere, said other application means being movable in response to fluid pressure in said chambers to effect the application of fluid pressure from the other of said motors to the other of said sources through the other of said flow passages in a predetermined ratio with that applied through said one flow passage when said selectively operable means is in the connecting position and movable in response to fluid pressure in only said one chamber to effect the application of fluid pressure through said other flow passage in a ratio to that applied through said one flow passage different than the predetermined ratio when said selectively operable means is in the venting position.

14. In a fluid pressure system having a pair of fluid pressure sources and a pair of fluid pressure responsive motors, a control valve including a housing, means within said housing providing a pair of fluid pressure flow passages respectively connected between said sources and motors, a pair of valve means controlling pressure fluid communication through said flow passages between said sources and motors, a pair of valve control means slidable in said housing and adapted for operative engagement with said valve means, an expansible chamber between said valve control means, said valve control means defining with said housing another expansible chamber, one of said valve control means being movable in response to an applied force into engagement with one of said valve means to move said one valve means to a position establishing pressure fluid flow through one of said flow passages, means for respectively connecting said chambers in open pressure fluid communication with the established pressure fluid flow in said one flow passage, the other of said valve control means being movable in response to fluid pressure in said chambers into engagement with the other of said valve means to move said other valve means to a position establishing pressure fluid flow through the other of said flow passages, the fluid pressures of the established pressure fluid flows in said flow passages having a predetermined ratio, and other means for interrupting the pressure fluid communication between said other chamber and said one flow passage and venting said other chamber to atmosphere, said other valve control means being movable in response to fluid pressure only in said first named chamber to move said other valve means to another position further establishing pressure fluid flow through said other flow passage and changing the ratio between the fluid pressure of the established pressure fluid flows in said flow passages from the predetermined ratio.

15. In a fluid pressure system having a pair of fluid pressure sources and a pair of fluid pressure responsive motors, a control valve comprising a housing, means within said housing providing a pair of pressure fluid flow passages respectively connected between said sources and motors, a pair of valve means in said flow passages normally interrupting pressure fluid communication therethrough between said sources and motors and venting said motors to the atmosphere, a pair of valve control means slidable in said housing, a pair of expansible chambers formed between said valve control means, one of said valve control means extending through the other of said valve control means and being movable in response to an applied force into engagement with one of said valve means to move said one valve means to a position establishing pressure fluid communication through one of said flow passages between one of said sources and motors and interrupting pressure fluid communication between said one motor and the atmosphere, passage means in said one valve control means connecting one of said chambers in open pressure fluid communication with the established fluid pressure in said one flow passage, said other valve control means being movable in response to fluid pressure in said one chamber into engagement with the other of said valve means to move said other valve means to a position establishing pressure fluid communication through the other of said flow passages between the other of said sources and motors and interrupting pressure fluid communication between said other motor and the atmosphere, the fluid pressures of the established fluid pressure flows in said flow passages having a predetermined ratio, and other means for selectively connecting the other of said chambers in pressure fluid communication with the established fluid pressure in said one flow passage wherein said other valve control means is movable in response to the fluid pressures in said chambers to move said other valve means to another position further establishing pressure fluid flow through said other flow passage having a fluid pressure substantially equal to that of the established fluid pressure flow through said one flow passage.

16. A control valve for fluid pressure comprising a housing having a pair of sets of ports therein, each port set including inlet, outlet and exhaust ports, a pair of valve means controlling pressure fluid communication between the ports of said port sets, respectively, a pair of valve control means slidable in said housing, an expansible chamber between said valve control means, one of said valve control means being movable in response to an applied force into engagement with one of said valve means to move said valve means to a position interrupting pressure fluid communication between the outlet and exhaust ports and establishing pressure fluid communication between the inlet and outlet ports of one of said port sets, passage means in said one valve control means connecting the established fluid pressure at the outlet port of said one port set with said chamber, another expansible chamber between valve control means and connected with either the fluid pressure at the outlet port of said one port set or the atmosphere, the other of said valve control members being movable in response to the fluid pressure in said chambers when said last named chamber is connected with the fluid pressure at the outlet port of said one port set into engagement with the other of said valve means to move said other valve means to a position interrupting pressure fluid communication between the outlet and exhaust ports and establishing pressure fluid communication between the inlet and outlet ports of the other of said port sets, the established fluid pressures at the outlet ports of said port sets having a predetermined ratio, and said other valve control means being movable in response to only the fluid pressure in said first named chamber when said last named chamber is vented to atmosphere to actuate said other valve means and establish a fluid pressure at the outlet port of said other port set having a ratio with that at the outlet port of said one port set different than the predetermined ratio.

17. A control valve for fluid pressure comprising a housing having a pair of sets of ports therein, each port set including inlet, outlet and exhaust ports, a pair of valve means normally interrupting pressure fluid communication between the inlet and outlet ports and establishing pressure fluid communication between the outlet and exhaust ports of said port sets, respectively, a pair of valve control means slidable in said housing, an expansible chamber defined between said valve control means, one of said valve control means extending through the other of said valve control means and having a free end thereon for engagement with one of said valve means, said one valve control means being movable in response to an applied force to engage the free end thereof with said one valve means and move said one valve means to a position interrupting pressure fluid communication between the outlet and exhaust ports and establishing pressure fluid communication between the inlet and outlet ports of one of said port sets, passage means in said one valve control means connecting said chamber with the established fluid pressure at the outlet port of said one port set, another expansible chamber defined in said housing between said valve control means and connected with either the established fluid pressure at the outlet port of said one port set or the atmosphere, said other valve control means being movable in response to fluid pressure in said chambers when said last named chamber is connected with the fluid pressure at the outlet port of said one port set into engagement with the other of said valve means to move said other valve means to a position interrupting pressure fluid communication between the outlet and exhaust ports and establishing pressure fluid communication between the inlet and outlet ports of the other of said port sets wherein the established fluid pressure at the outlet port of said other port set is predeterminately proportional to that at the outlet port of said one port set, and said other valve control means being movable in response to only fluid pressure in said first named chamber when said last named chamber is vented to atmosphere to actuate said other valve means and establish a fluid pressure at the outlet port of said other port set in a proportion with that at the outlet port of said one port set different than the predetermined proportion.

18. A control valve for fluid pressure comprising a housing having a pair of sets of chambers therein, each of said chamber set including inlet and outlet chambers, a pair of connecting passages in said housing between the chambers of said chamber sets, respectively, a pair of valve means in the inlet chambers of said chamber sets normally closing said connecting passages, exhaust passage means in said valve means normally venting the outlet chambers of said chamber sets to atmosphere, a pair of valve control means slidable in said housing, a pair of expansible chambers formed between said valve control means, one of said valve control means being movable through one of said connecting passages and exhaust passage means in response to an applied force into engagement with one of said valve means to close the exhaust passage means therein and subsequently move said one valve means to an open position establishing pressure fluid communication between the chambers of one of said chamber sets, other passage means in one of said valve control means connecting one of said expansible chambers in open pressure fluid communication with the outlet chamber of said one chamber set, the other of said expansible chambers being connected in open pressure fluid communication with either the outlet chamber of said one chamber set or the atmosphere, the other of said valve control means being movable through the other of said connecting passages into engagement with the other of said valve means in response to fluid pressure in said expansible chambers when said other expansible chamber is connected with the outlet chamber of said one chamber set and subsequently movable to move said other valve means to an open position establishing fluid communication between the chambers of the other of said port sets wherein the established fluid pressure in the outlet chamber of said other chamber set is substantially equal to that in the outlet chamber of said one chamber set, and said other valve control means being movable in response to fluid pressure in only said one expansible chamber when said other expansible chamber is connected with the atmosphere to actuate said other valve means and establish a fluid pressure in the outlet chamber of said other chamber set less than that in the outlet chamber of said one chamber set.

19. A control valve for fluid pressure comprising a housing having a pair of sets of ports therein, each port set including inlet, outlet and exhaust ports, a pair of connecting passages in said housing between the inlet and outlet ports of said port sets, a pair of valve seats on said housing in circumscribing relation with said connecting passages, a pair of valve means normally urged into engagement with said valve seats to interrupt pressure fluid communication between the inlet and outlet ports of said port sets, respectively, a pair of exhaust passages in said valve means normally in open pressure fluid communication with said connecting passages and communicating the outlet and exhaust ports of said port sets, a pair of valve control means slidable in said housing, a pair of extensions on said valve control means, one of said extensions extending through the other of said extensions and the exhaust passages of one of said valve means, another pair of valve seats on said extensions for engagement with said valve means, one of said valve control means being movable in response to an applied force thereon to move said one extension and engage one of said last named valve seats with said one valve means to close the exhaust passage therein and subsequently disengage said one valve means from one of said first named valve seats to open one of said connecting passages and establish pressure fluid communication between the inlet and outlet ports of one of said port sets, said valve control means defining an expansible chamber therebetween and defining with said housing another expansible chamber therebetween separate from said first named chamber, passage means in said one extension connecting said first named chamber in open pressure fluid communication with the established fluid pressure at the outlet port of said one port set, said other chamber being connected in open pressure fluid communication with either the atmosphere or the established fluid pressure at the outlet port of said one port set, the other of said valve control means being movable in response to fluid pressure in said chambers when said other chamber is connected in open pressure fluid communication with the established fluid pressure in the outlet port of said one port set to move the other of said extensions and engage the other of said last named valve seats with the other of said valve means to close the exhaust passage therein and subsequently disengage said other valve means from the other of said first named valve seats to open the other of said connecting passages and establish pressure fluid communication between the inlet and outlet ports of the other of said port sets, the magnitudes of the established fluid pressures at the outlet ports of said port sets being substantially equal, and said other valve control means being movable in response to only fluid pressure in said first named chamber when said other chamber is vented to atmosphere to actuate said other valve means and establish fluid pressure at the outlet port of said other port set having a magnitude less than that established at the outlet port of said one port set.

20. A control valve for fluid pressure comprising a housing having a pair of sets of ports therein, each port set including inlet and outlet ports, an exhaust port in said housing, first valve means controlling pressure fluid communication between the ports of one of said port sets, and said exhaust port, second valve means controlling pressure fluid communication between the ports of the other of said port sets, third valve means including first passage means normally establishing pressure fluid communication between the outlet port of said other port set and said exhaust port, a pair of valve control means slidable in said housing, a pair of expansible chambers between said valve control means, second passage means in one of said valve control means normally establishing pressure fluid communication between one of said chambers and said exhaust port, said one valve control means being initially movable in response to an applied force thereon into engagement with said third valve means to interconnect said first and second passage means to establish open pressure fluid communication between said one chamber and the outlet port of said other port set and interrupt pressure fluid communication between said one chamber and outlet port of said other port set with said exhaust port, and said one valve control means being subsequently movable to engage said third valve means with said second valve means and move said second valve means to a position establishing pressure fluid communication between the ports of said other port set, and other means for connecting the other of said chambers in open pressure fluid communication with either the outlet port of said other port set or the atmosphere, said other valve control means being movable in response to fluid pressure in said chambers when said other chamber is connected to the outlet port of said other port set into engagement with said first valve means to move said first valve means to a position interrupting pressure fluid communication between the outlet port of said one port set and said exhaust port and establishing pressure fluid communication between the ports of said one port set, the magnitudes of the fluid pressures established at the outlet ports of said port sets being in a predetermined ratio, and said other valve control means being movable in response to fluid pressure in only said one chamber when said other chamber is vented to atmosphere to actuate said first valve means and establish fluid pressure at the outlet port of said other port set having a magnitude different than that of the established fluid pressure at the outlet port of said one port set.

21. A control valve for fluid pressure comprising a housing having a pair of port sets, each port set including inlet and outlet ports, a pair of valve means controlling pressure fluid communication between said ports, a resiliently urged seating member spaced from one of said valve means, first and second passage means in the other of said valve means and said seating member normally venting the outlet ports of said port sets to atmosphere, respectively, a pair of control means slidable in said housing, a pair of chambers formed between said control means, a valve seat on said seating member in circumscribing relation with said second passage means, extension means on one of said control means extending through the other of said control means and having a free end thereon for engagement with said valve seat, third passage means in said extension means having one end connected with one of said chambers and the other end thereof extending through said free end to normally vent said one chamber to the atmosphere, said one control means and extension means being movable in response to an applied force to engage said free end with said valve seat interrupting pressure fluid communication between said one chamber and the outlet port of one of said port sets with the atmosphere and interconnecting said second and third passage means to establish pressure fluid communication between said one chamber and the outlet port of said one port set, and said one control means and extension means being further movable to move said seating member into engagement with one of said valve means to move said one valve means to a position establishing pressure fluid communication between the inlet and outlet ports of said one port set, and means connecting the other of said chambers in open pressure fluid communication with either the outlet port of said one port set or the atmosphere, said other control member being movable in response to fluid pressure in said chambers when said other chamber is connected in open pressure fluid communication with the outlet port of said one port set into engagement with the other of said valve means to close said first passage means and then move said other valve means to a position establishing pressure fluid communication between the inlet and outlet ports of the other of said port sets wherein the established fluid pressures at the outlet ports of said port sets are in a predetermined ratio, and said other control means being movable in response to fluid pressure in only said one chamber when said other chamber is connected in open pressure fluid communication with the atmosphere to actuate said other valve means and establish fluid pressure at the outlet port of said other port set having a ratio with that at the outlet port of said one port set different than the predetermined ratio.

References Cited in the file of this patent

FOREIGN PATENTS

| 92,118 | Holland | Sept. 15, 1959 |
| 798,816 | Great Britain | July 30, 1958 |